Inventor:
W. P. Shepherd
By
Attorney

Patented May 3, 1932

1,856,733

UNITED STATES PATENT OFFICE

WINFRED P. SHEPHERD, OF PASADENA, CALIFORNIA

PACKED BOX ACCUMULATOR

Application filed October 1, 1929. Serial No. 396,434.

My invention relates to article handling devices and more particularly to conveyors.

In many industries conveyors are used to collect articles of some product or other from a multiplicity of processors and deliver these all to a single processor. As an example of this, in the citrus industry, fruit is packed in shipping boxes by hand packers, and the packed boxes are collected by a conveyor system and delivered to a lidding press where they are lidded. The conveyor is made to be automatically shut off whenever two boxes have been delivered to the lidder since the last previous box has been removed from the conveyor to be lidded by the lidder operator.

In large houses the lidding press comprises an automatic nailing machine which, when working steadily, has more than sufficient capacity to take care of all the boxes packed in the house. In the lidding of boxes, however, interruptions are frequent owing to the crushing of fruit by lids, the breaking of lids, failure of nails to feed from the stripper, etc. In the present system, when a house is packing near to capacity these interruptions in the operation of the lidding machine cause the packed box conveying system to be halted to such an extent that portions of that system adjacent the packers get filled with packed boxes. As a result of this, the packers frequently are idle waiting for the conveyor to move and make space onto which they can transfer boxes resting on their packing stands which they have finished packing.

It is correspondingly an object of my invention to increase the efficiency of a conveyor such as a packed box collecting conveyor, by providing means which greatly decreases the responsiveness of the conveyor to interruptions in the discharge of boxes at its end.

In the preferred embodiment of the invention disclosed herein this means comprises a box accumulator disposed between the discharge end of the conveyor and the lidding machine. This accumulator has means for continually propelling packed boxes along a runway provided thereby. At the discharge end of the accumulator a manually operable stop is provided which holds up all the boxes on the accumulator while the lidding machine operator is lidding a box or while he is interrupted by any delay such as one of those previously mentioned. In previously devised means for power feeding boxes along a conveyor, the entire weight of the boxes rests on continuously rotating rollers. The aggregate friction on the entire accumulator using a drive of this kind however becomes prohibitive as the accumulator fills up.

It is therefore another object of my invention to provide an improved continuously operating friction conveyor in which a predetermined amount of friction can be applied to the objects conveyed.

The manner of accomplishing the foregoing objects, as well as further objects and advantages, will be made manifest in the following description and in the accompanying drawings, in which.

Figure 3:
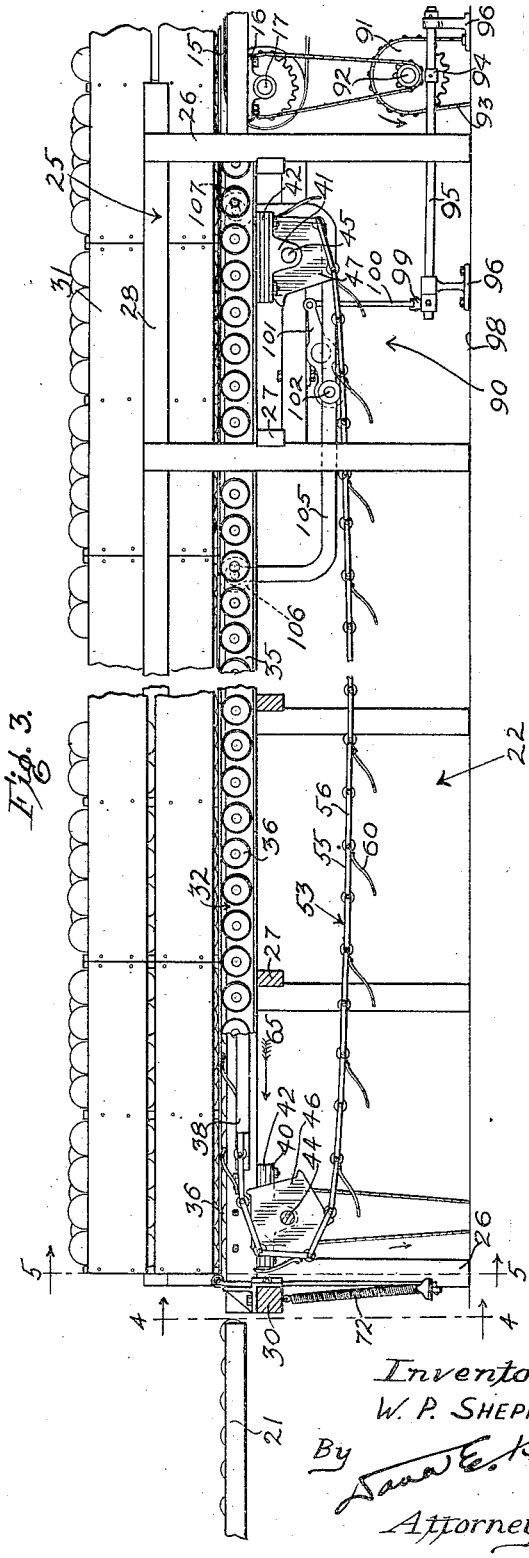
Fig. 3 is a horizontal vertical sectional view taken on the line 3—3 of Fig. 2.

Figs. 4 and 5 are transverse vertical sectional views taken on the lines 4—4 and 5—5 respectively of Fig. 3.

Fig. 6 is a fragmentary perspective view illustrating one of the pressure links of said invention.

Fig. 7 is a fragmentary perspective view illustrating a box stop of said invention.

Figure 1:
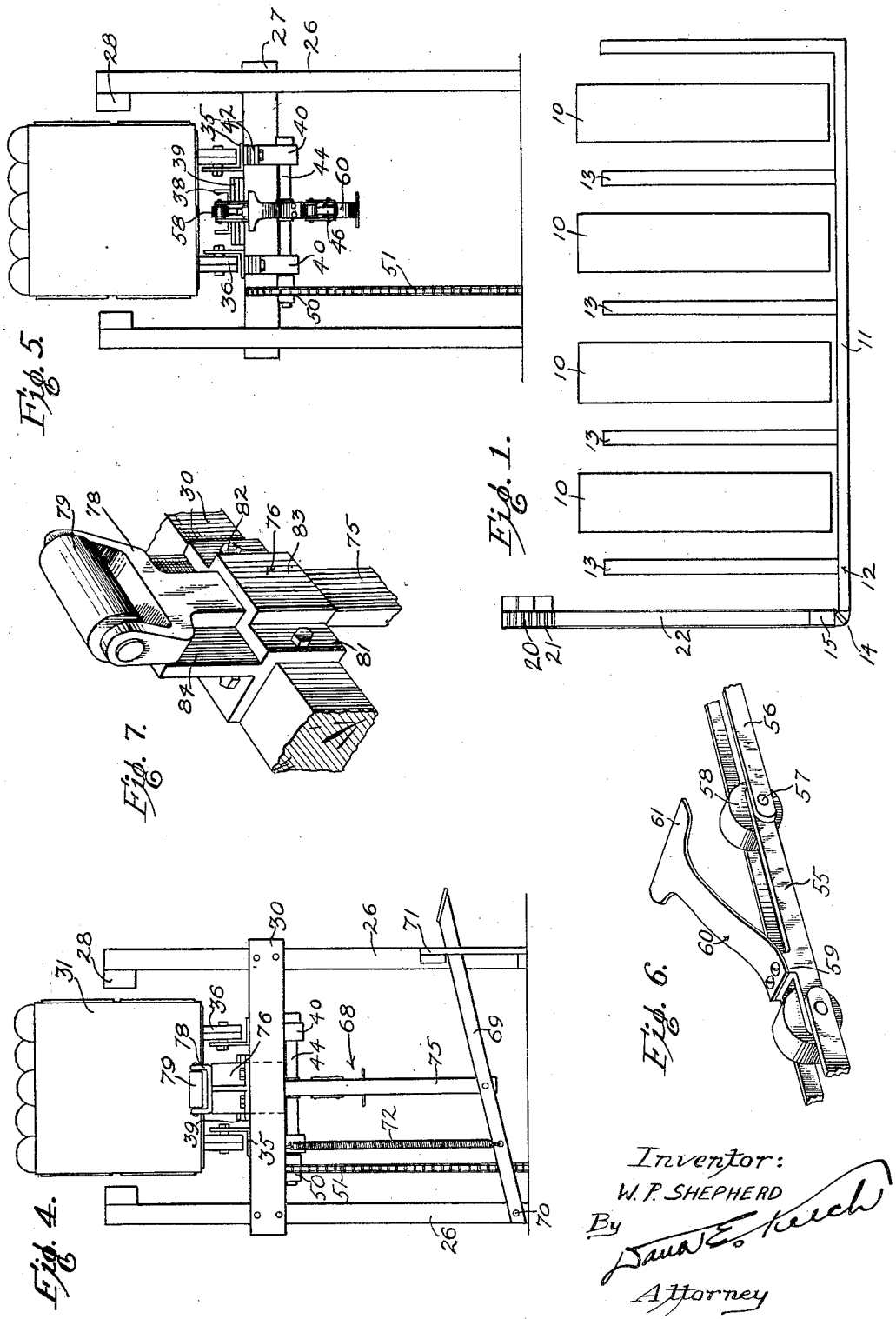
Fig. 1 is a diagrammatic plan view illustrating the use of my invention.

Referring specifically to the drawings, Fig. 1 shows a series of fruit sizers 10. Along one end of the series of sizers 10 extends a main belt 11 of a packed box conveyer 12, this conveyor having lateral feeders 13 which are disposed alongside the sizers 10 and which feed into the main belt 11. At the discharge end of the belt 11 is disposed a corner 14, which, with suitable guides, feeds boxes discharged from the belt 11 onto a short conveyor belt section 15. The conveyor belt section 15 has a forward drum 16 mounted upon a shaft 17 from which shaft the entire conveyor 12 is driven.

Spaced from the belt 15, preferably about the length of one of the sizers 10, is a box lidder 20, the box conveyor 21 of this lidder being in alignment with the belt 15. Disposed between the conveyor belt section 15 and the lidder conveyor 21 is the accumulator 22 of my invention.

The accumulator 22 has a frame 25 including legs 26, cross pieces 27 and longitudinal box guides 28. In place of the cross bar 27 joining the endmost pair of legs 26 at the discharge end of the accumulator 22 is a cross bar 30 which is slightly larger in cross section than the cross bars 27. The longitudinal box guides 28 are mounted on the inner faces of the legs 26 at the upper end of these legs and are spaced at a slightly greater distance than the width of a standard packing box which it is desired to handle on the apparatus of Fig. 1.

This apparatus is shown as handling standard orange shipping boxes 31. Mounted upon the cross bars 27 and 30 are rails 32 of a track 33 on which the boxes 31 are adapted to travel when passing over the accumulator 22. Each rail 32 includes an angle iron 35 having wheels 36 pivotally secured to an upstanding flange thereof. The rails 32 are equally spaced from the longitudinal axis of the accumulator 22. Also mounted on the cross bars 27 is a channel member 38 which is spaced from the cross bars 27 by shims 39 so that the height of the channel member 38 may be adjusted.

Mounted upon the under faces of the angle irons 35 are bearings 40 and 41. These bearings are spaced from the angle irons 35 by shims 42 which will permit the vertical adjustment of these bearings. Rotatable in the bearings 40 and 41 are shafts 44 and 45 having secured thereon pentagonal sprockets 46 and 47. Secured to one end of the shaft 44 is a sprocket 50, which is driven by a chain 51 so as to rotate the shaft 44 and the sprocket 46. Passing around the sprockets 46 and 47 is a link belt 53 having spring carrying links 55 and overlapping links 56, which links are connected by pivot pins 57 upon which are mounted rollers 58. Each of the links 55 has a cross bar portion 59 upon which is mounted an upwardly and rearwardly extending leaf spring 60 having a T-head 61 formed thereon.

The upper flight of the link belt 53 lies within the channel beam 38, the rollers 58 rolling on this channel beam so as to support said upper flight. When the accumulator 22 is unoccupied by boxes 31 the heads 61 of the springs 60 extend above the rollers 36. When a box 31 rests on the rollers 36 the springs 60 immediately therebeneath are depressed so that movement of this chain belt in the direction of the arrow 65 by rotation of the shaft 44 creates a friction between these springs and this box 31 which tends to move the box over the rollers 36 in the direction of the arrow 65.

Mounted upon the cross bar 30 and the legs 26 connected therewith, is a box stop means 68. This means includes a pedal bar 69 pivoted at 70 to one of said legs 26 and slidable at the opposite end in a guideway 71 connected to the opposite leg 26. Connected to both the cross bar 30 and the foot bar 69 is a tension spring 72 which urges the bar 69 into its upwardmost position in the guideway 71. Connected to a middle portion of the bar 69 is a stop bar 75 which extends upwardly through a cast bracket 76 which is mounted on the cross bar 30 as clearly shown in Figs. 3, 4 and 7. On the upper end of the bar 75 is a yoke 78 between the arms of which is rotatably mounted a roller 79. The cast bracket 76 has a base portion 81 which is secured to the cross bar 30 by suitable bolts 82. Extending around and guiding the bar 75 is a neck 83 while disposed behind and bracing the yoke 78 is a buttress plate 84, the neck 83 and the plate 84 being integral with the base 81.

Owing to the action of the spring 72 the roller 79 is normally disposed upwardly in the path of any boxes 31 resting on the rollers 36 as shown in Fig. 4. Depression of the pedal bar 69 lowers the roller 79 out of the path of any such boxes and permits the foremost box to be fed onto the lidder conveyor 20. The lidder operator may manually assist this feeding to speed up his work and make a space between this box and the one following, in which space the stop roller 79 may rise again into its stopping position.

Figure 2:
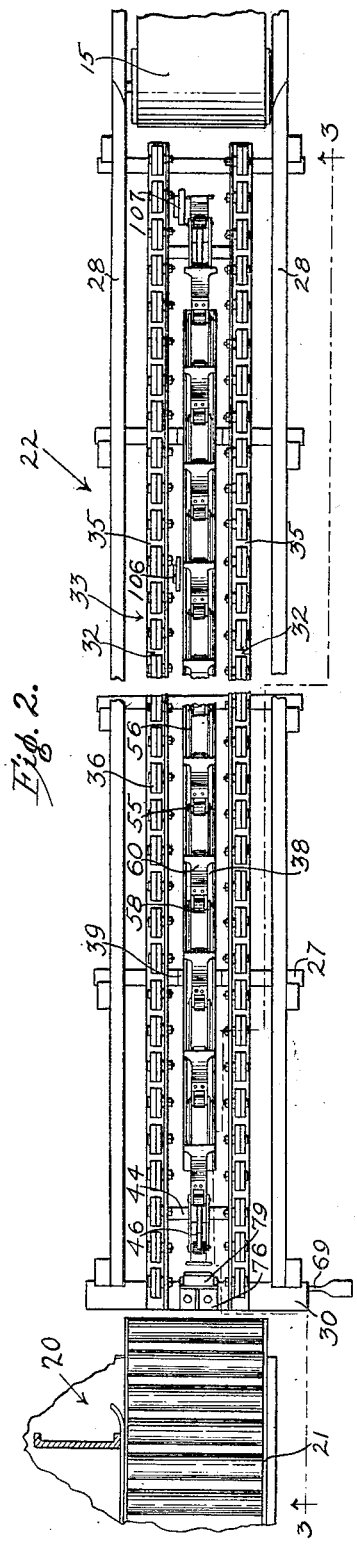
Fig. 2 is a fragmentary plan view illustrating a preferred embodiment of my invention.

At the right hand end of the accumulator 22 as shown in Figs. 2 and 3, is a conveyor control mechanism 90. This mechanism includes a clutch 91 mounted upon a shaft 92, the shell of the clutch 91 being driven by a chain 93. The shaft 92 has a sprocket which is connected by a suitable chain to a sprocket on the shaft 17 so that when the clutch 91 is engaged the shaft 17 will be rotated, thus operating the entire packed box conveyor 12. The clutch 91 is actuated by a yoke 94 on a shaft 95 which is mounted in suitable bearings 96 rigidly supported in any manner, as by the floor 98. Secured to the end of the shaft 95 is an arm 99 which connects to a link 100 and extends upwardly and is pivotally secured to a free end of a lever 101. The lever 101 is centrally pivoted to a rigid mounting provided on the frame 25 and at its opposite end from the link 100 has a pin 102 upon which is pivotally supported a rocker arm 105. Opposite ends of the rocker arm 105 extend oppositely and have rollers 106 and 107 provided thereon. The spring in the clutch 91 normally swings the yoke 94 to rotate the shaft 95, pull down the link 100, and lift the rocker arm 105 so that one or the other of the wheels 106 and 107 is disposed above the rollers 36.

The wheels 106 and 107 are spaced apart a greater distance than the length of one of the boxes 31. This permits single boxes to travel successively over these rollers without bodily depressing the rocker arm 105. Successive contact between the single box and the wheels 106 and 107 merely results in a rocking of the rocker arm 105 about its pivot pin 102. When two boxes, spaced apart a distance which is less than the spacing of the wheels 106 and 107, are fed onto the accumulator 22, both of the wheels 106 and 107 are depressed at the same time. This depresses the pivot pin 102 and rocks the lever 101 which causes the conveyor control mechanism 90 to throw out the clutch 91 and stop the entire packed box conveyor 12.

As previously stated, the lidder 20 which includes an automatic nailing machine for nailing the lids on these after they are pressed into position, has a capacity, when running continuously, far in excess of the output of all of the packers working on the apparatus shown in Fig. 1. However, from time to time there are certain interruptions in the operation of the lidder 20. In the present practice where the lidder 20 is placed right next to the control mechanism 90 at the end of the packed box conveyor 12 and dead rollers only support the boxes fed from this conveyor, each of these interruptions results in the quick accumulation of two boxes at the lidder with the resultant stopping of the entire packed box conveyor 12. With the stopping of the conveyor 12 the portions of the collector belts 13 opposite the sizer bins having the predominant size of fruit soon jam with packed boxes so as to slow up the work of the packers and make it impossible for them to find space on the collector belts 13 in which to put the boxes they have packed. The accumulator 22 makes it possible to keep the conveyor 12 running during a relatively long pause in the operation of the lidder 20 and enables the operator of the lidder to operate his machine at its maximum capacity after this interruption so as to lid and dispose of the string of boxes 31 which have accumulated. The much more continuous operation of the packed box conveyor 12 which results from this keeps the packed boxes cleared away from opposite the point where the packers are most closely grouped. This facilitates the packer's work and increases the efficiency of the entire packing house.

One of the distinct advantages of the present invention proceeds from the fact that the amount of friction between the springs 60 and the boxes 31 may be adjusted, the means shown herein for this purpose comprising the shims 39 and 42. By this adjustment the speed and force with which the boxes 31 are propelled along the accumulator 22 may be so determined that no more power is wasted when the boxes 31 are stopped on the accumulator than is necessary to secure reasonably quick acceleration when they are released.

While but a single embodiment of my invention is shown and described herein, it is to be understood that various modifications may be made in this embodiment without departing from the spirit of the invention or the scope of the appended claims.

What I claim is:

1. In a power conveyor for boxes, the combination of: a track upon which a series of boxes to be conveyed are adapted to travel; an endless member, a flight of which passes adjacent said boxes; yieldable friction means carried by said endless member and engaging said boxes; and power transmitting means actuating said endless member to cause said friction means to engage and move said boxes along said track.

2. In a power conveyor for boxes, the combination of: a series of anti-friction members upon which a series of boxes are adapted to travel; an endless member, a flight of which passes adjacent said boxes; friction spring elements inclined rearwardly from the direction of travel and carried by said endless member and engaging said boxes; and power transmitting means actuating said endless member to cause said friction elements to engage and move said boxes along said rails.

3. In a power conveyor for boxes, the combination of: a track upon which a series of boxes to be conveyed are adapted to travel; a link belt, a flight of which passes adjacent said boxes; a series of yieldable springs carried by links of said belt and engaging said boxes; and power transmitting means actuating said belt to cause said springs to engage and move said boxes along said track.

4. In a power conveyor for boxes, the combination of: a track upon which a series of boxes to be conveyed are adapted to travel; a link belt, a flight of which passes adjacent said boxes; yieldable friction means carried by links of said belt and engaging said boxes; power transmitting means actuating said belt to cause said friction means to engage and move said boxes along said track; and means for controlling the amount of friction between said friction means and said boxes.

In testimony whereof, I have hereunto set my hand at Los Angeles, California, this 26th of September, 1929.

WINFRED P. SHEPHERD.